United States Patent
Goerick et al.

(10) Patent No.: US 7,644,059 B2
(45) Date of Patent: Jan. 5, 2010

(54) INTEGRATING VISUAL AND OBJECT INFORMATION IN A PERVASIVE COMPUTING ENVIRONMENT

(75) Inventors: Christian Goerick, Seligenstadt (DE);
Edgar Körner, Seligenstadt (DE);
Andreas Richter, Rodgau (DE);
Bernard Sendhoff, Bruchköbel (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 0 days.

(21) Appl. No.: 11/067,123

(22) Filed: Feb. 25, 2005

(65) Prior Publication Data

US 2005/0234977 A1 Oct. 20, 2005

(30) Foreign Application Priority Data

Mar. 3, 2004 (EP) .................................. 04005027
May 25, 2004 (EP) .................................. 04012383

(51) Int. Cl.
*G06F 15/00* (2006.01)

(52) U.S. Cl. .......................... 706/62; 706/45; 382/103; 382/312; 700/245; 700/246; 700/247; 700/248; 700/255; 700/258

(58) Field of Classification Search .................... 706/10, 706/45; 382/103–109, 155, 173, 232, 276, 382/312–324; 700/103, 255, 245–248, 258
See application file for complete search history.

(56) References Cited

U.S. PATENT DOCUMENTS

| | | | | |
|---|---|---|---|---|
| 4,628,453 A | * | 12/1986 | Kamejima et al. | 701/28 |
| 4,831,641 A | * | 5/1989 | Niemi | 377/53 |
| 5,056,031 A | * | 10/1991 | Nakano et al. | 701/301 |
| 6,161,071 A | * | 12/2000 | Shuman et al. | 701/48 |
| 6,453,055 B1 | * | 9/2002 | Fukumura et al. | 382/103 |
| 6,459,955 B1 | * | 10/2002 | Bartsch et al. | 700/245 |
| 6,609,710 B1 | | 8/2003 | Order | |
| 6,629,028 B2 | * | 9/2003 | Paromtchik et al. | 701/23 |
| 6,764,373 B1 | * | 7/2004 | Osawa et al. | 446/175 |
| 7,177,459 B1 | * | 2/2007 | Watanabe et al. | 382/151 |
| 2002/0027652 A1 | * | 3/2002 | Paromtchik et al. | 356/141.1 |
| 2002/0029103 A1 | * | 3/2002 | Breed et al. | 701/45 |

(Continued)

FOREIGN PATENT DOCUMENTS

EP 1 182 610 A1 2/2002

(Continued)

OTHER PUBLICATIONS

Shott, Anneliese, "Feature-Based Camera-Guided Grasping by an Eye-in-Hand Robot" 1992, pp. 1832-1837.*

(Continued)

*Primary Examiner*—David R Vincent
*Assistant Examiner*—Omar F Fernandez Rivas
(74) *Attorney, Agent, or Firm*—Fenwick & West LLP

(57) ABSTRACT

One embodiment of the present invention provides a method for gathering information from an environment. In a first step, visual information is gathered from the environment. In a second step, information actively transmitted by objects in the environment is received. According to one embodiment, the information actively transmitted by objects in the environment is received wirelessly. In a third step, the visual information is combined with the received information in order to recognize objects.

20 Claims, 1 Drawing Sheet

U.S. PATENT DOCUMENTS

| | | | |
|---|---|---|---|
| 2002/0143436 A1* | 10/2002 | Takamura | 700/245 |
| 2002/0198632 A1* | 12/2002 | Breed et al. | 701/1 |
| 2003/0009259 A1* | 1/2003 | Hattori et al. | 700/245 |
| 2003/0009261 A1* | 1/2003 | Parker et al. | 700/258 |
| 2003/0078696 A1* | 4/2003 | Sakamoto et al. | 700/245 |
| 2003/0149803 A1 | 8/2003 | Wilson | |
| 2004/0001197 A1* | 1/2004 | Ko et al. | 356/152.1 |
| 2004/0008253 A1 | 1/2004 | Monroe | |
| 2004/0030451 A1* | 2/2004 | Solomon | 700/245 |
| 2004/0030455 A1* | 2/2004 | Hirai et al. | 700/259 |
| 2004/0153211 A1* | 8/2004 | Kamoto et al. | 700/245 |
| 2005/0021178 A1* | 1/2005 | Kim et al. | 700/245 |
| 2006/0111810 A1* | 5/2006 | Kim et al. | 700/186 |
| 2006/0173577 A1* | 8/2006 | Takeda et al. | 700/245 |
| 2006/0184272 A1* | 8/2006 | Okazaki et al. | 700/245 |
| 2006/0293786 A1* | 12/2006 | Baba et al. | 700/245 |
| 2008/0008353 A1* | 1/2008 | Park et al. | 382/103 |

FOREIGN PATENT DOCUMENTS

| | | |
|---|---|---|
| GB | 2 347 834 A | 9/2000 |
| WO | WO 00/46743 | 8/2000 |

OTHER PUBLICATIONS

Das et al. "Ad Hoc Networks for Localization and Control", IEEE Conference on Decision Control, 2002, pp. 2978-2983.*

Tang et al. "Planning Mobile Sensor Net Deployment for Navigationally-Challenged Sensor Nodes", IEEE International Conference on Robotics & Automation, 2004, pp. 172-179.*

Yukawa et al. "Autonomous Control of Care and Welfare Robot", IEEE, 2004, pp. 53-54.*

European Search Report, EP 04 01 2383, Sep. 13, 2004, 3 pages.

\* cited by examiner

INTEGRATING VISUAL AND OBJECT INFORMATION IN A PERVASIVE COMPUTING ENVIRONMENT

CROSS-REFERENCE TO RELATED APPLICATIONS

This application is related to and claims priority from European Patent Applications No. 04 005 027.0 filed on Mar. 3, 2004 and 04 012 383.8 filed on May 25, 2004, which are all incorporated by reference herein in their entirety.

FIELD OF THE INVENTION

The present invention relates to gathering information on objects in a pervasive computing environment.

BACKGROUND OF THE INVENTION

Scene analysis using visual information is an active research field. For constrained environments with a restricted number of objects, successful applications such as face recognition have been reported. However, in natural environments the success of scene analysis using purely visual information from monocular or stereo camera systems has been limited. Often additional sensors have been added, such as radar or infrared sensors, to support and ease the processing done by the vision system. A system using multimodal integration in a ubiquitous computing environment is described in U.S. Patent Application No. 2003/0149803A1, entitled System and Process for Controlling Electronic Components in a Ubiquitous Computing Environment Using Multimodal Integration, filed on May 31, 2002, which is incorporated by reference herein in its entirety.

Pervasive Computing relates to devices having processing and communication capabilities, but which may not be considered traditional computers. In pervasive and ubiquitous computing environments, one or more elements or objects in the environment transmit some information, which can either be used by any of the other objects and/or by a new object entering the room. An example is a mobile computer that is taken into such a computing environment and is automatically able to detect and connect to printers and networks that are available. However, such small computing devices are not restricted to technological objects, they can easily be used in clothing or attached to objects of every day usage. Pervasive computing devices are described in GB 2347834A, which is incorporated by reference herein in its entirety.

What is needed is a method and system for improving the capabilities of a computing device to gather information on objects in its environment.

SUMMARY OF THE INVENTION

According to one embodiment of the present invention, a computing system can gather information from the environment and especially on objects in its environment. The system comprises means for gathering visual information from the environment, means for receiving information actively transmitted by objects in the environment, and means for combining the visual information as well as the received information in order to recognize objects. According to a further embodiment, the actively transmitted information is received wirelessly. According to various exemplary embodiments, the computing system can be a mobile computing device, a robot such as a humanoid robot, a computing device fixed to an automobile or motorcycle, or a stationary device.

A further embodiment of the present invention relates to a method for gathering information from an environment, comprising the steps of gathering visual information from the environment, receiving information actively transmitted by one or more objects in the environment, and combining the visual information as well as the received information in order to recognize objects. According to one embodiment, the actively transmitted information is received wirelessly. A still further embodiment of the present invention relates to a computer program product implementing such a method.

The present invention advantageously improves the capabilities of a computing device to gather information on objects in its environment.

DETAILED DESCRIPTION OF THE PREFERRED EMBODIMENTS

Figure 1:
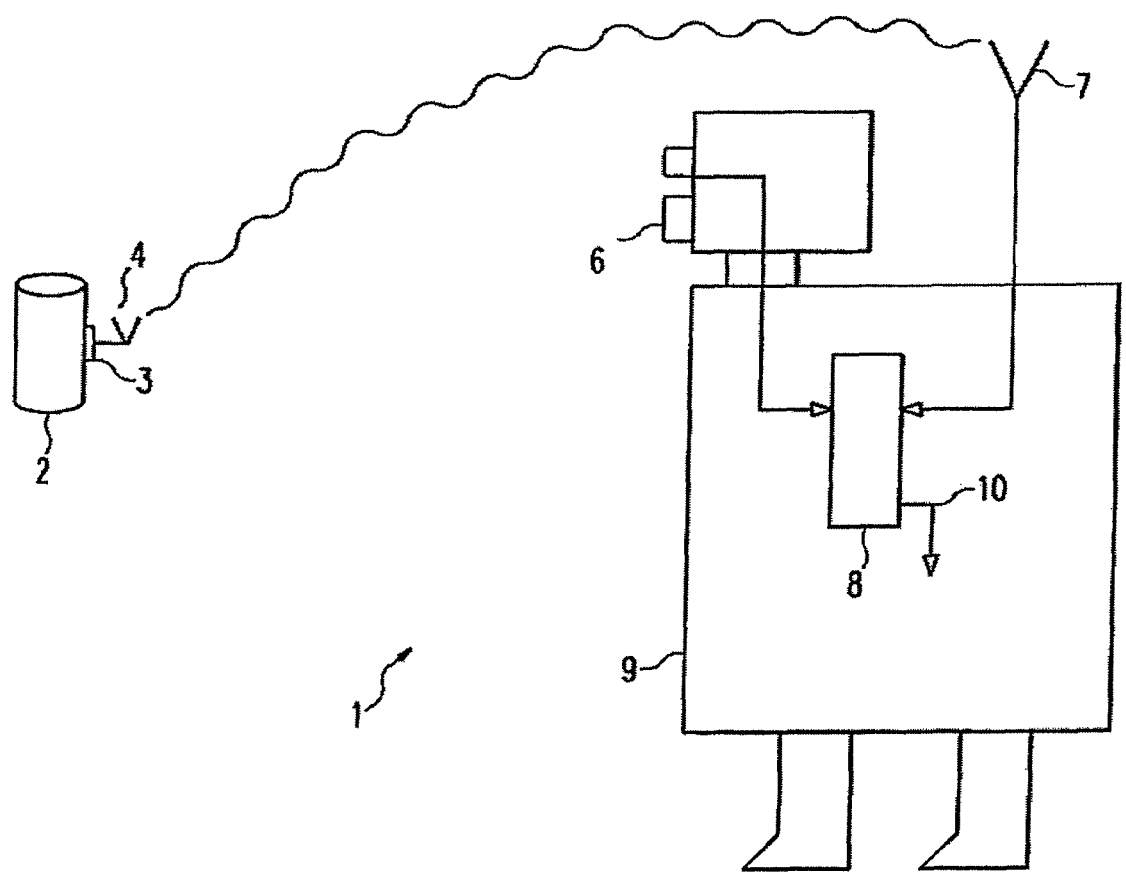
FIG. 1 shows a system for gathering and processing multimodal information on an environment.

The features, advantages and objects according to one embodiment of the present invention will now be explained with reference to FIG. 1.

In FIG. 1, reference 1 generally designates a system for gathering and logically processing multimodal information on the environment, and particularly on object 2 in the environment of a computing device 9. According to one embodiment, "environment" designates an area surrounding computing device 9, such that computing device 9 can gather sensorial information or receive wirelessly transmitted signals from objects located within said area.

According to one embodiment, computing device 9 is provided with at least two devices for gathering information: a visual sensor 6 and an antenna 7 with following receiver stage (not shown in the figure) for receiving wirelessly transmitted information from the object 2. An example of visual sensor 6 is a camera.

According to a further embodiment, the two devices for gathering information produce two input data streams. These two input data streams are combined and processed in an integrator unit 8. According to a still further embodiment, integrator unit 8 makes a decision on objects identified by at least two multimodal input streams and can generate output signals 10 based on the decision. Examples of such a decision include whether to activate an actuator or whether to move computing device 9 toward an identified object.

According to yet another embodiment, object 2 is provided with an RF ID tag transmitting information on the associated object 2.

One embodiment of the present invention therefore provides an integrator unit 8 that is able to combine visual information with information transmitted from objects and elements in a pervasive or ubiquitous computing environment. Therefore, one advantage of the present invention is that information that is often difficult to obtain from purely visual analysis can thereby be augmented by information from the object 2 itself and vice versa. We will refer to the information that is transmitted by object 2 as subjective information and the information that is gathered by the vision system as objective information. A reason for this differentiation is now explained.

According to one embodiment, the information transmitted by object 2 includes information from the viewpoint of object 2 itself, i.e., this information is object-centered. Examples of this type of information include static information such as existence, shape, color, weight, symmetry information, or fragility, etc.; as well as dynamic information such as temperature, full/empty, etc.

According to a further embodiment, the vision system, can gather visual information that is not just centered on one object 2, but takes relations between and positions of objects into account; therefore, we call this type of information objective.

The above differentiation between subjective and objective information also highlights an exemplary advantage of the present invention over conventional solutions. While conventional solutions added additional sensory devices to a system and fused the information provided by these different devices, one embodiment of the present invention advantageously combines different types of information, for example, subjective and objective.

According to one embodiment, visual sensor 6 and integrator 8 are mounted on a mobile platform, for example a humanoid robot. However, alternative embodiments are possible as explained below. The mobile platform may enter a pervasive computing environment, which includes at least one object that is able to supply information about itself. According to a further embodiment, this information is combined by integrator 8 at different stages with the visual information processing system and with behavior generation systems. According to one embodiment, in the mobile platform example, the object could be a mug on a table that is provided with a RF ID tag to send out subjective information about its existences like shape, color, weight, moderately fragile. According to a further embodiment, the RF ID tag can actively send out this information upon receipt of a requesting activation signal from the integrator.

According to one embodiment, the vision system will already be able to supply several hypotheses for objects on the table, including artifacts or objects that are not part of the pervasive computing environment.

According to a further embodiment, based on coarse information such as color, the integrator can focus the vision system on a particular part of its field of view. For example, using shape information it is possible to decide whether object 2 is partially occluded. To provide another example, it is possible to deduce which side of object 2 is facing a mobile platform; for grasping purposes it might be necessary for the platform to change its position. To provide yet another example, a decision whether two objects partially occlude each other or whether they are parts of one object can be difficult to reach from an objective or subjective information source alone. Using the pervasive computing environment and the visual information, the integrator 8 of the present invention can advantageously reach such a decision with little effort. Furthermore, integrator 8 can provide additional information such as the degree of fragility or empty/full to other devices of the overall system like a manipulator. This information can be used by the system driving the manipulator on how to and with how much force to approach the object.

Various exemplary embodiments of the present invention include a humanoid robot with an integrator system and a camera system on board entering a pervasive computing environment; an automobile with an integrator system and a camera systems on board for gathering information from other automobiles, intelligent clothes of pedestrians, traffic signs and other objects related to a traffic scene that can be supplied with pervasive computing devices.

Another embodiment of the present invention provides a stationary integrator and camera system, where an object enters the area of surveillance, such as an in-room system or a surveillance system in an airport, bank, or train station. Examples of pervasive computing objects that may enter the area of the stationary system include intelligent clothes, or luggage. Still further embodiments of the present invention include an integrator and camera system on mobile devices such as pda's, laptops or mobile telephones.

One embodiment of the present invention provides a system mounted on an active and autonomous mobile platform, for example a humanoid robot, comprised of a camera part and an integrator part that can perform the combination of subjective and objective information for scene analysis and/or for controlling additional devices of the overall system like manipulators.

Another embodiment of the present invention provides a system mounted on a passive or partially active and non-autonomous or partially autonomous mobile platform, for example an automobile, comprised of a camera part and an integrator part that can perform the above combination of subjective and objective information for scene analysis and in turn for controlling additional devices of the system such as lights, brakes or seat-belts, etc.

Yet another embodiment of the present invention provides a stationary system comprised of a camera part and an integrator part that can perform the above combination of subjective and objective information for scene analysis and in turn for controlling additional devices like alarm devices or providing requested information to a user.

The present invention may be embodied in various forms and should not be construed as limited to the embodiments set forth herein. Rather, these embodiments are provided so that disclosure will be thorough and complete and will fully convey the invention to those skilled in the art. Further, the apparatus and methods described are not limited to rigid bodies. While particular embodiments and applications of the present invention have been illustrated and described herein, it is to be understood that the invention is not limited to the precise construction and components disclosed herein and that various modifications, changes, and variations may be made in the arrangement, operations, and details of the methods and apparatuses of the present invention without departure from the spirit and scope of the invention as it is defined in the appended claims.

The invention claimed is:

1. An identification system for identifying objects in an environment by gathering information from the environment near a computer system, the identification system comprising:
   a first object having a first RFID tag for transmitting first object information about said first object, wherein said first object information includes at least one of a shape, color, weight, symmetry information, fragility, temperature, or object content of said first object;
   a second object having a second RFID tag for transmitting second object information about said second object, wherein said second object information includes at least one of a shape, color, weight, symmetry information, fragility, temperature, or object content of said second object; and
   a robot having the computing system, the robot having:
   visual sensing means for receiving visual information from the environment,
   antenna means for wirelessly receiving said object information transmitted by said first and second objects, wherein said antenna means receives said first object information directly from said first object and said antenna means receives said second object information directly from said second object, and means for combining said visual information and said object information to identify said first and second objects and to make a first decision about at least one of said first or second objects;

output means for generating an output signal based upon said first decision;

a manipulator, disposed to receive said output signal, said manipulator physically manipulates at least one of said first and second objects in response to said output signal.

2. The identification system of claim 1, wherein the system is a mobile computing device.

3. The identification system of claim 1, wherein the computing system is mounted in an automobile or motorbike.

4. The identification system of claim 1, wherein the computing system is a stationary device.

5. The identification system of claim 1, wherein said object information includes information from the perspective of the object.

6. The identification system of claim 1, wherein said first object is at least partially occluding said second object from the perspective of the visual sensing means of the robot.

7. The identification of claim 1, wherein said output signal includes information about the position of at least one of said first and second objects and said object information about at least one of said one of said first and second objects.

8. The identification system of claim 1, wherein said output signal includes information about at least one of positioning information, fragility information, or the empty/full state of at least one of said first and second objects.

9. The identification system of claim 6, wherein said output signal includes information about the position of at least one of said first and second objects and said object information about at least one of said one of said first and second objects.

10. The identification system of claim 6 wherein said output signal includes information about at least one of positioning information, fragility information, or the empty/full state of at least one of said first and second objects.

11. A method for gathering information from a first environment in order to control a robot, the method comprising the steps of:

gathering visual information from the first environment, receiving object information actively transmitted wirelessly by first and second objects in the first environment that are external to the robot, wherein each of the objects includes an RFID tag that transmits said object information, wherein said robot receives said object information directly from said first and second objects and wherein said object information includes at least one of a shape, color, weight, symmetry information, fragility, temperature, or object content of said first and second objects;

combining the visual information with the object information in order to make a decision on identified objects;

generating output signals based on said decision; and activating a manipulator of the robot in response to said output signals, said manipulator to physically manipulate at least one of said identified objects.

12. The method of claim 11, wherein said object information includes information from the perspective of the object.

13. The method of claim 11, wherein a first object of said identified objects is at least partially occluding a second object of said identified objects from the perspective of the robot.

14. The method of claim 11, wherein said output signal includes information about the position of at least one of said first and second objects and said object information about at least one of said one of said first and second objects.

15. The method of claim 11, wherein said output signal includes information about at least one of positioning information, fragility information, or the empty/full state of at least one of said first and second objects.

16. The method of claim 13, wherein said output signal includes information about the position of at least one of said first and second objects and said object information about at least one of said first and second objects.

17. The method of claim 13, wherein said output signal includes information about at least one of positioning information, fragility information, or the empty/full state of at least one of said first and second objects.

18. A computer software program product embodied on a computer readable medium for performing the method of claim 1 when run on a computing device.

19. A computer software program product embodied on a computer readable medium for performing the method of claim 11 when run on a computing device.

20. A computer software program product implementing the method of claim 11 when running on a computing device.

* * * * *